UNITED STATES PATENT OFFICE.

PAUL ANTOINE MARIE LACROIX AND JULES RICHARD, OF PARIS, FRANCE.

PHOTOMETER.

1,315,972.    Specification of Letters Patent.    Patented Sept. 16, 1919.

Application filed October 27, 1917. Serial No. 198,852.

*To all whom it may concern:*

Be it known that we, PAUL ANTOINE MARIE LACROIX, of 91 Boulevard Haussmann, Paris, manufacturer, and JULES RICHARD, of 25 Rue Mélingue, Paris, manufacturer, both in the Republic of France, have invented Improvements in or Relating to Photometers, of which the following is a full, clear, and exact description.

Numerous apparatus have been devised for the purpose of determining the time of exposure in photography; none of them however, have realized in a satisfactory manner the object aimed at.

All these apparatus necessitate operations which are long and complicated, are incompatible with the requirements of instantaneous photography and furnish indications which are generally uncertain and very often absolutely inaccurate.

Almost all of them, as a matter of fact, are worked by the exposure to daylight of a band or sheet of sensitive paper, under conditions which vary with the system of the apparatus. Besides, this exposure requires a certain time, (a prohibitive condition in many cases) it also requires delicate observation for the appreciation of the color obtained and more or less complex deductive calculations.

On the other hand the results finally obtained are generally either uncertain or very inaccurate because they are indicative of the surrounding luminous intensity but not at all of the actinic value of the light emitted by the subject to be photographed, which is very different.

Certain apparatus, it is true, lessen this latter disadvantage by devices which are sometimes ingenious, but the operations and the calculations which are always necessary remain none the less long and complicated and the results are always inaccurate.

The present invention has for its object a photometer which obviates the disadvantages above mentioned.

By its special constitution this photometer permits exact indications to be obtained in all cases and the real value of the time of exposure necessary for obtaining a normal photograph to be determined directly without the aid of any calculation.

This apparatus is based upon the application to photographic photometry of the principle of the photometers of the laboratories, consisting in measuring the light emitted by a source of unknown luminous intensity by comparison with the illuminating power of a standard light of known intensity and is characterized by the application of a special device which permits of the differences of illumination to be measured.

The present photometer comprises broadly:—

(*a*) A telescope body containing two small chambers placed side by side which receive respectively, one, the light coming from the subject to be photographed and the other the light emitted by a luminous source of known intensity, such for example, as a small electric lamp; these two illuminations form upon two ground glasses, or upon a single ground glass, arranged at the rear part of these chambers, two distinct luminous areas.

(*b*) An adjusting and measuring device which permits of establishing the equivalence of illumination of these two luminous areas by the operation of a device which allows the amount of light emitted by the standard lamp to be varied; the value of the movement communicated to the regulating device for the purpose of obtaining this equivalence of illumination thus determines the ratio of illumination of the two luminous areas formed in the interior of the instrument at the commencement of the observation and permits of the deduction therefrom of the luminous intensity of the subject to be photographed and consequently the value of the time of exposure.

The accompanying drawing shows, by way of example, a photometer constructed according to the present invention.

Figure 1:
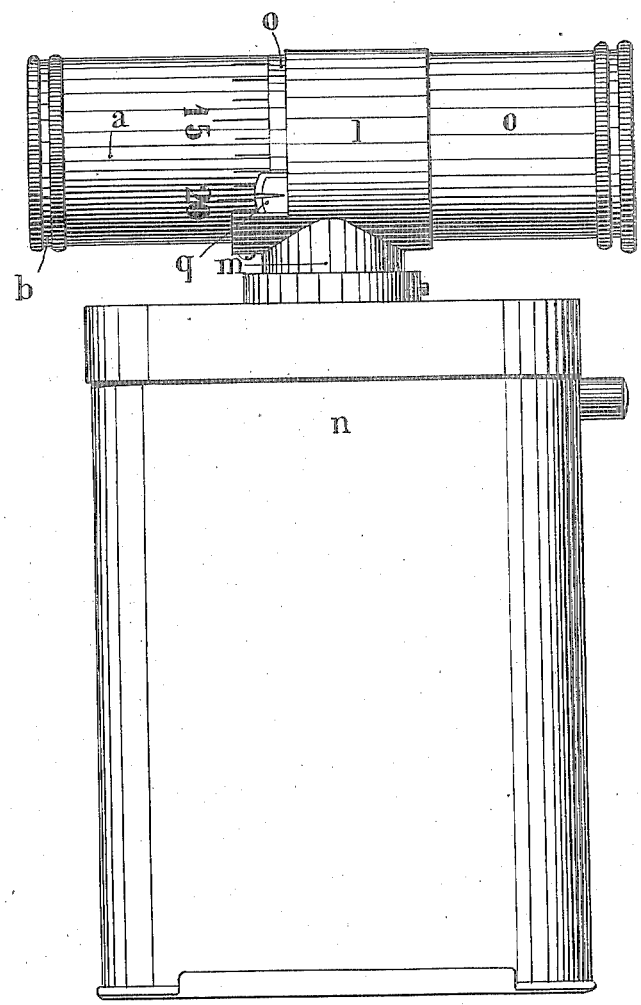
Figure 1 is an elevation of the apparatus.
Figure 2:
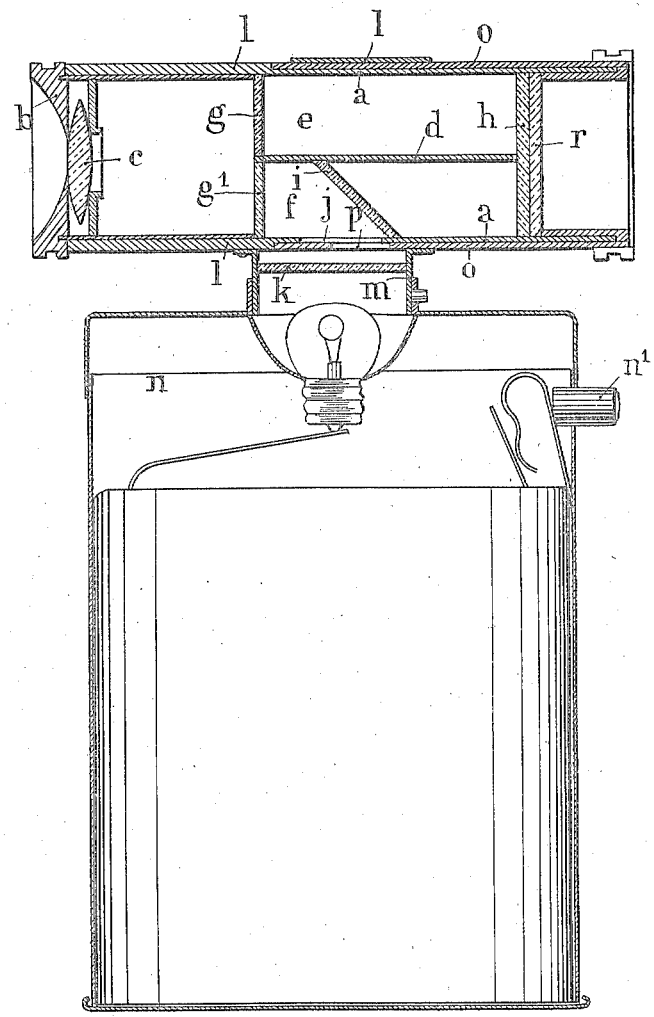
Fig. 2 is a vertical section.

As is shown in the drawing, this photometric apparatus comprises a telescope body $a$ provided preferably with an adjustable hood $b$, carrying an eyepiece $c$; along a portion of its length this telescope body is divided by an internal partition $d$ into two chambers $e$ and $f$; two ground glasses $g$ and $g'$, or a single ground glass close these latter at their rear portions.

The chamber $e$ is closed at its front part by a ground glass diffuser h, through which enter the outer luminous rays coming from the subject to be photographed.

The chamber f contains a mirror i set at angle of 45°, or a diffusing surface which sends the rays emitted by a standard lamp onto the ground glass g' parallel with the rays passing through the chamber e; an opening j made in the telescope body a allows of the introduction into the chamber f of the rays emitted by the standard lamp; a ground glass k mounted in front of the mirror i insures the uniformity of the luminous field furnished by this lamp.

The telescope body a is fixed to a collar l provided with a tubulus m which allows the instrument to be adapted by means of a bayonet joint, for example, to a socket on the case of an lectric pocket lamp n, the casing of which will conveniently serve as a handle for the instrument.

Figure 3:
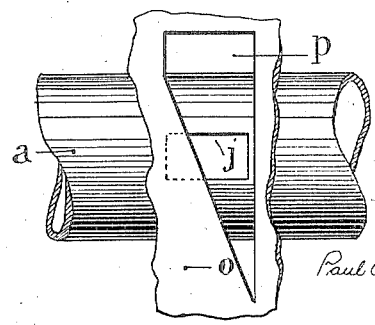
Fig. 3 is a detail view of the regulating device.

Upon the telescope body a is carried a movable tube o adapted to rotate thereon and in which is an opening p of suitable form and progressively increasing size, moving in the rotary movement imparted to the tube o, opposite the opening j and thus uncovering or covering it up progressively as shown in the detail view illustrated in Fig. 3. By imparting a rotary movement to the shutter tube o upon the telescope body a the light sent from the lamp into the instrument is thus varied. An index q carried by the movable tube o moves during this movement past a graduation carried by the telescope body and the divisions of which correspond to the different degrees of opening of the opening j' through which the rays emitted by the standard lamp n enter the instrument. Now as the luminous intensity of this lamp is constant, and since the amplitude of angular movement communicated to the shutter tube o, for bringing about the equivalence of the two luminous areas formed on the two ground glasses g and g' is proportional to the ratio of the quantity of light sent by the standard lamp n and that of the rays coming from the subject to be photographed, the graduations of the scale over which the index q moves may, consequently indicate the different times of exposure corresponding to the different degrees of illumination.

The light emitted by the standard lamp n having an orange yellow shade in comparison with sunlight which by comparison with this latter appears blue, the appreciation of the two illuminations produced by the light of the subject to be photographed on the one hand, and the light of the electric lamp on the other hand, might offer some difficulties; in order to eliminate them, a screen r, of an orange yellow color is mounted against the ground glass h; this orange yellow color is so chosen that the screen r gives to the light coming from the subject to be photographed, and which passes through this screen, a coloration which is as near as possible to that of the light of the standard lamp n.

The two illuminations of the two luminous areas formed on the two ground glasses g and g' have thus therefore practically the same coloration and under these conditions can be compared very easily and brought to an identity of intensity.

The method of using the present photometric apparatus is as follows:—

The observer, holding the instrument in one hand by the casing of the lamp n, which serves as a handle, looks through the eyepiece c of the telescope body a at the subject to be photographed, then, having pressed upon the push n' of the lamp so as to establish electrical contact, he sees the two luminous areas formed upon the two ground glasses g and g' and turns the shutter tube o so as to modify the intensity of the light furnished by the standard lamp n, until the illuminations of these two ground glasses g and g' are equivalent. The division in front of which the index q carried by the shutter tube o stops gives the value of the time of exposure.

It is to be understood that the embodiment above described is given by way of example only, and that any other device for regulating may be employed to obtain the equivalence of illumination of the two luminous areas formed in the interior of the instrument; thus for example a graduated diaphragm might be placed in front of the ground glass through which the light coming from the subject to be photographed enters, the intensity of the light furnished by the standard lamp remaining constant, or it may be regulated by a shutter device similar to that above described. The intensity of the light furnished by the lamp might also be regulated by means of any rheostat.

Further there might be constructed for a given photographic apparatus, a table indicating the opening of the objective and the speed of the shutter of this photographic apparatus for each division of the graduation of the instrument, that is to say, for each time of exposure given by this latter.

The shape, the dimensions and the details of construction of the photometric instrument may be modified.

Claims:

1. A photometer comprising a telescope body, two longitudinal chambers arranged side by side in said body, one chamber communicating with the outside through one end of said body and the other chamber through an aperture in the side wall of said body, a light reflecting device in the latter chamber, means surrounding said body for varying the opening of said aperture, and an exterior standard light adapted to be secured to said body to illuminate one of said chambers.

2. A photometer comprising a telescope body, two longitudinal chambers arranged side by side in said body, one chamber communicating with the outside through one end of said body and the other chamber through an aperture in the side wall of said body, a light reflecting device in the latter chamber, light diffusing means at both ends of each chamber, a rotatable sleeve surrounding said body, said sleeve having an aperture of gradually increasing width adapted to uncover the aperture in the side wall of said body to a variable extent, and an exterior standard light adapted to be secured to said body to illuminate one of said chambers.

3. A photometer comprising a telescope body, two longitudinal chambers arranged side by side in said body, one chamber communicating with the outside through one end of said body and the other chamber through an aperture in the side wall of said body, a light reflecting device in the latter chamber, light diffusing means at both ends of each chamber, means surrounding said body for varying the opening of said aperture, and a standard light adapted to be secured to said body exteriorly thereof.

4. A photometer comprising a telescope body, two longitudinal chambers arranged side by side in said body, one chamber communicating with the outside through one end of said body and the other chamber through an aperture in the side wall of said body, a light reflecting device in the latter chamber, means for varying the amount of light rays entering one of said chambers, a detachable handle adapted to engage said body, and a standard light in said handle arranged to face the outer end of one of said chambers when the handle engages said body.

5. A photometer comprising a telescope body, two longitudinal chambers arranged side by side in said body, one chamber communicating with the outside through one end of said body and the other chamber through an aperture in the side wall of said body, a light reflecting device in the latter chamber, means surrounding said body for varying the opening of said aperture, a handle for said body covering said aperture, and a standard electric light in said handle facing said aperture.

6. A photometer comprising a telescope body, two longitudinal chambers arranged side by side in said body, one chamber communicating with the outside through one end of said body and the other chamber through an aperture in the side wall of said body, a light reflecting device in the latter chamber, light diffusing means at both ends of each chamber, means for varying the opening of said aperture, a socket surrounding said aperture, and a pocket flash-light adapted to engage said socket.

7. A photometer comprising a cylindrical tube, an eye-piece at one end of said tube, two longitudinal chambers arranged side by side in said tube, one chamber communicating with the outside through the end of said tube remote from said eye-piece, the other chamber communicating with the outside through an aperture in the side wall of said tube, a light reflecting device in the latter chamber, ground glasses at both ends of each chamber, a colored glass at the outer end of the first chamber, a standard light adapted to be secured to the outside of said tube opposite said aperture, and a rotatable sleeve surrounding said tube, said sleeve having an aperture of gradually increasing width adapted to uncover said aperture to a regulable extent.

The foregoing specification of our "improvements in or relating to photometers" signed by us this fifth day of October, 1917.

PAUL ANTOINE MARIE LACROIX.
JULES RICHARD.

Witnesses:
FRANÇOIS WEBER,
CHAS. P. PRESSLY.